United States Patent
Sikkink et al.

(10) Patent No.: US 7,333,516 B1
(45) Date of Patent: Feb. 19, 2008

(54) INTERFACE FOR SYNCHRONOUS DATA TRANSFER BETWEEN DOMAINS CLOCKED AT DIFFERENT FREQUENCIES

(75) Inventors: Mark Ronald Sikkink, Chippewa Falls, WI (US); William A. Huffman, Los Gatos, CA (US); Vernon W. Swanson, Chippewa Falls, WI (US); Nan Ma, Chippewa Falls, WI (US); Randal S. Passint, Chippewa Falls, WI (US)

(73) Assignee: Silicon Graphics, Inc., Sunnyvale, CA (US)

( * ) Notice: Subject to any disclaimer, the term of this patent is extended or adjusted under 35 U.S.C. 154(b) by 1087 days.

(21) Appl. No.: 09/621,315

(22) Filed: Jul. 20, 2000

(51) Int. Cl.
*H04J 3/06* (2006.01)
(52) U.S. Cl. ...................................... 370/503
(58) Field of Classification Search ................ 370/401, 370/402, 419, 545
See application file for complete search history.

(56) References Cited

U.S. PATENT DOCUMENTS

| | | | |
|---|---|---|---|
| 4,375,051 A | 2/1983 | Theall | 333/17 |
| 4,477,713 A | 10/1984 | Cook et al. | 219/124.34 |
| 4,514,749 A | 4/1985 | Shoji | 357/68 |
| 4,587,445 A | 5/1986 | Kanuma | 307/443 |
| 4,615,040 A | 9/1986 | Mojoli et al. | 375/267 |
| 4,637,018 A | 1/1987 | Flora et al. | 371/1 |
| 4,696,019 A | 9/1987 | Tulpule et al. | 375/107 |
| 4,755,704 A | 7/1988 | Flora et al. | 307/269 |
| 4,805,195 A | 2/1989 | Keegan | 375/106 |
| 4,823,184 A | 4/1989 | Belmares-Sarabia et al. | 358/27 |
| 4,833,695 A | 5/1989 | Greub | 375/118 |
| 4,845,390 A | 7/1989 | Chan | 307/602 |
| 4,860,322 A | 8/1989 | Lloyd | 375/107 |
| 4,896,272 A | 1/1990 | Kurosawa | |
| 4,926,066 A | 5/1990 | Maini et al. | 307/303.1 |
| 4,958,349 A | 9/1990 | Tanner et al. | 714/759 |
| 4,959,540 A | 9/1990 | Fan et al. | 250/227.12 |
| 5,087,829 A | 2/1992 | Ishibashi et al. | 307/269 |
| 5,194,765 A | 3/1993 | Dunlop et al. | 307/443 |
| 5,224,105 A | 6/1993 | Higley | 714/748 |

(Continued)

FOREIGN PATENT DOCUMENTS

EP 0989484 A1 * 3/2000

(Continued)

OTHER PUBLICATIONS

"Low Power Quad Differential Line Driver with Cut-Off", *National Semiconductor, F100K ECL 300 Series Databook and Design Guide*, pp. 2-54-2-60, (1992).

(Continued)

*Primary Examiner*—Daniel J. Ryman
(74) *Attorney, Agent, or Firm*—Schwegman, Lundberg & Woessner, P.A.

(57) ABSTRACT

The present invention provides an interface and method for synchronous data transfer between domains clocked at different frequencies. The interface includes a first latch for receiving data from a first domain clocked at one frequency when the first latch is selected and a second latch for receiving data from the first domain when the second latch is selected. A third latch is provided for transferring data from either the first latch or the second latch to the second domain when the second domain is clocked.

12 Claims, 8 Drawing Sheets

U.S. PATENT DOCUMENTS

| | | | | |
|---|---|---|---|---|
| 5,256,912 | A | * | 10/1993 | Rios .......................... 327/144 |
| 5,287,359 | A | | 2/1994 | Engelse ................... 370/100.1 |
| 5,295,132 | A | | 3/1994 | Hashimoto et al. ........... 370/13 |
| 5,315,175 | A | | 5/1994 | Langner ..................... 307/443 |
| 5,329,188 | A | | 7/1994 | Sikkink et al. ............. 307/517 |
| 5,394,528 | A | | 2/1995 | Kobayashi et al. ......... 395/325 |
| 5,416,606 | A | | 5/1995 | Katayama et al. .......... 358/467 |
| 5,428,806 | A | | 6/1995 | Pocrass |
| 5,481,567 | A | | 1/1996 | Betts et al. ................. 375/261 |
| 5,490,252 | A | | 2/1996 | Macera et al. ........... 395/200.1 |
| 5,502,733 | A | | 3/1996 | Kishi et al. ................. 714/748 |
| 5,506,953 | A | | 4/1996 | Dao ........................... 395/166 |
| 5,521,836 | A | | 5/1996 | Hartong et al. |
| 5,535,223 | A | | 7/1996 | Horstmann et al. |
| 5,544,203 | A | | 8/1996 | Casasanta et al. .......... 375/376 |
| 5,555,188 | A | | 9/1996 | Chakradhar |
| 5,561,844 | A | | 10/1996 | Jayapalan et al. .......... 455/442 |
| 5,603,056 | A | | 2/1997 | Totani ........................ 395/828 |
| 5,604,450 | A | | 2/1997 | Borkar et al. ................. 326/82 |
| 5,617,537 | A | | 4/1997 | Yamada et al. ........ 395/200.01 |
| 5,631,611 | A | | 5/1997 | Luu et al. .................... 333/17.3 |
| 5,657,346 | A | | 8/1997 | Lordi et al. ................. 375/224 |
| 5,682,512 | A | | 10/1997 | Tetrick ....................... 395/412 |
| 5,748,547 | A | | 5/1998 | Shau .......................... 365/222 |
| 5,757,658 | A | | 5/1998 | Rodman et al. |
| 5,758,131 | A | * | 5/1998 | Taylor ........................ 713/401 |
| 5,760,620 | A | | 6/1998 | Doluca |
| 5,761,735 | A | * | 6/1998 | Huon et al. ................. 713/600 |
| 5,778,308 | A | | 7/1998 | Sroka et al. ................ 455/115 |
| 5,778,429 | A | | 7/1998 | Sukegawa et al. .......... 711/129 |
| 5,784,706 | A | | 7/1998 | Oberlin et al. .............. 711/202 |
| 5,787,268 | A | | 7/1998 | Sugiyama et al. |
| 5,793,259 | A | | 8/1998 | Chengson .................... 331/78 |
| 5,811,997 | A | | 9/1998 | Chengson et al. ........... 327/112 |
| 5,828,833 | A | | 10/1998 | Belville et al. ......... 395/187.01 |
| 5,844,954 | A | | 12/1998 | Casasanta et al. .......... 375/373 |
| 5,847,592 | A | | 12/1998 | Gleim et al. ................ 327/403 |
| 5,850,422 | A | | 12/1998 | Chen .......................... 375/371 |
| 5,898,729 | A | | 4/1999 | Boezen et al. .............. 375/259 |
| 5,909,563 | A | * | 6/1999 | Jacobs ........................ 710/305 |
| 5,910,898 | A | | 6/1999 | Johannsen |
| 5,915,104 | A | | 6/1999 | Miller ......................... 395/309 |
| 5,929,717 | A | | 7/1999 | Richardson et al. ....... 333/17.3 |
| 5,978,953 | A | | 11/1999 | Olarig ......................... 714/768 |
| 6,000,022 | A | * | 12/1999 | Manning ..................... 711/167 |
| 6,005,895 | A | | 12/1999 | Perino et al. ................ 375/288 |
| 6,016,553 | A | | 1/2000 | Schneider et al. ............ 714/21 |
| 6,049,887 | A | * | 4/2000 | Khandekar et al. ......... 713/503 |
| 6,112,285 | A | | 8/2000 | Ganapathy et al. ......... 711/207 |
| 6,161,169 | A | | 12/2000 | Cheng ........................ 711/150 |
| 6,240,031 | B1 | | 5/2001 | Mehrotra et al. ........... 365/220 |
| 6,272,651 | B1 | | 8/2001 | Chin et al. .................... 714/43 |
| 6,310,815 | B1 | | 10/2001 | Yamagata et al. ..... 365/230.03 |
| 6,333,922 | B1 | | 12/2001 | Campanella ................ 370/319 |
| 6,363,502 | B1 | | 3/2002 | Jeddeloh ....................... 714/52 |
| 6,412,056 | B1 | | 6/2002 | Gharachorloo et al. ..... 711/202 |
| 6,463,548 | B1 | | 10/2002 | Bailey et al. |
| 6,487,685 | B1 | | 11/2002 | Fiske et al. .................. 714/701 |
| 6,535,527 | B1 | * | 3/2003 | Duffy .......................... 370/509 |
| 6,535,946 | B1 | * | 3/2003 | Bryant et al. ............... 710/305 |
| 6,553,421 | B1 | | 4/2003 | Frick et al. .................. 709/227 |
| 6,573,764 | B1 | | 6/2003 | Taylor |
| 6,839,856 | B1 | | 1/2005 | Fromm et al. |

FOREIGN PATENT DOCUMENTS

| | | |
|---|---|---|
| EP | 0989484 A2 | 3/2000 |
| JP | 03-008427 | 1/2003 |

OTHER PUBLICATIONS

"The SA27 library includes programmable delay elements DELAYMUXO and DELAYMUXN. How are these cells used?", *IBM Delaymuxn Book*, pp. 1-6, (Feb. 1999).

Djordjevic, A.R., et al., "Time Domain Response of Multiconductor Transmission Lines", *Proceedings of the IEEE*, 75(6), 743-64, (Jun. 1987).

Im, G., et al., "Bandwidth-Efficient Digital Transmission over Unshielded Twisted-Pair Wiring", *IEEE Journal on Selected Areas in Communications*, 13(9), 1643-1655, (Dec. 1995).

Mooney, R., et al., "A 900 Mb/s Bidirectional Signaling Scheme", *IEEE Journal of Solid-State Circuits*, 30(12), 1538-1543, (Dec. 1995).

Takahashi, T., et al., "110GB/s Simultaneous Bi-Directional Transceiver Logic Synchronized with a System Clock", *IEEE International Solid-State Circuits Conference*, 176-177, (1999).

*Lattice Semiconductor Corporation*, http://www.latticesemi.com,(2002), 7 pgs.

"Dynamic Datapath Selection for Unpredictable Transger Starts", *IBM Technical Disclosure Bulletin*, TBA-ACC-NO: NA9402589, Issue No.: 2A, Cross Reference: 0018-8689-37-2A-589,(1994),589-592.

"Dynamic Switch to Data Slow Mode on a Memory Card", *IBM Technical Disclosure Bulletin*, 37, NA9402637,(1994),321-322.

"Memory Card Data Fastpath", *IBM Technical Disclosure Bulletin*, 37, TDB-ACC-NO: NA9402637, Issue No.: 2A, Cross Reference: 0018-8689-37-2A-637, (1994),637-638.

"Synchronous External bus Architecture", *IBM Technical Disclosure Bulletin*, Jan. 1, 1993, 104-107.

Brewer, Kevan, "Re: Memory mapped registers", (*Online*): comp.arch.embedded, (May 2, 1996).

Gjessing, et al., "Performance of RamLink Memory Achritecture", *Proceedings HICSS'94*, (1994), 154-162.

Gjessing, Stein, et al., "RamLink: A High-BandwidthPoint-to-Point Memory Architecture", *Proceeding CompCon*, (1992),328/331.

IEEE STD, "IEEE Standard for High-Bandwidth Memory Interface Based on Scalable Coherent Interface(SCI) Signaling Technology (RAMLink)", *IEEE Std 1596.4-1996*, (1996), 1-91.

Rao, A., "Memory mapped registers", new://comp.arch.ambedded, (Apr. 27, 1996).

*Accelerated Graphics Port Interface Specification, Revision 2.0*, Intel Corporation,(May 4, 1998),52-83.

* cited by examiner

INTERFACE FOR SYNCHRONOUS DATA TRANSFER BETWEEN DOMAINS CLOCKED AT DIFFERENT FREQUENCIES

FIELD OF THE INVENTION

The present invention is related to integrated circuits, and more particularly to an interface for synchronous data transfer between domains, circuits, systems or the like clocked at different frequencies when the clocks are derived from the same high frequency source.

BACKGROUND INFORMATION

What is needed is an interface that will permit the synchronous transfer of data between different domains, circuits, systems or the like that are clocked at different frequencies with minimal latency and error free transfer of the data.

Transfer of data between domains clocked at different frequency ratios is possible with a circular First-In-First-Out (FIFO) buffer. However, this transfer is asynchronous creating latency in the transfer of the data which can adversely affect the speed or efficiency of performance of the domains, circuits or systems operating at different clock frequencies that need to communicate with each other. Input data from the sending domain is strobed or written into the FIFO buffer at the data rate of the sending domain with a "write pointer," and the data is read or transferred to the receiving domain at the data rate of the receiving domain by a "read pointer." The control logic controlling the transfer of data must be programmed to prevent the "write pointer" from overtaking the "read pointer" and vise versa. The size of the buffer and difference between the two frequency domains are important considerations for efficient and error free data transfer.

SUMMARY OF THE INVENTION

In accordance with the present invention, an interface for synchronous data transfer between domains clocked at different frequencies includes a first latch for receiving data from a first domain clocked at one frequency when the first latch is selected and a second latch for receiving data from the first domain when the second latch is selected. A third latch is provided for transferring data from either the first latch or the second latch to the second domain clocked at another frequency. The third latch is toggled to receive data from either the first or second latch in response to a negative edge of a clock pulse of the second domain. Data is also alternately loaded in either the first or second latch from the first domain for transfer to the second domain when the second domain is clocked.

In further accordance with the present invention, a method for synchronous data transfer between clocked domains includes: loading a first master latch with data from the first domain in response to a first domain clock pulse; transferring the data loaded in the first master latch to the second domain through a slave latch in response to a second domain clock pulse; toggling the slave latch to switch to receive data from a second master latch in response to a negative edge of the clock pulse of the second domain clock; loading the second master latch with data from the first domain in response to another first domain clock pulse; transferring the data loaded in the second master latch to the second domain through the slave latch in response to another second domain clock pulse; toggling the slave latch to switch to receive data from the first master latch in response to the negative edge of the clock pulse of the second domain clock; repeating a cycle of alternately loading the first and second master latches and transferring data to the second domain through the slave latch until a master clear (MC) signal is received by the slave and master latches. At least one non-operate or hold state is entered during each repeated cycle for at least one clock pulse of the faster domain clock to prevent the faster clocked domain from overrunning the slower clocked domain.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
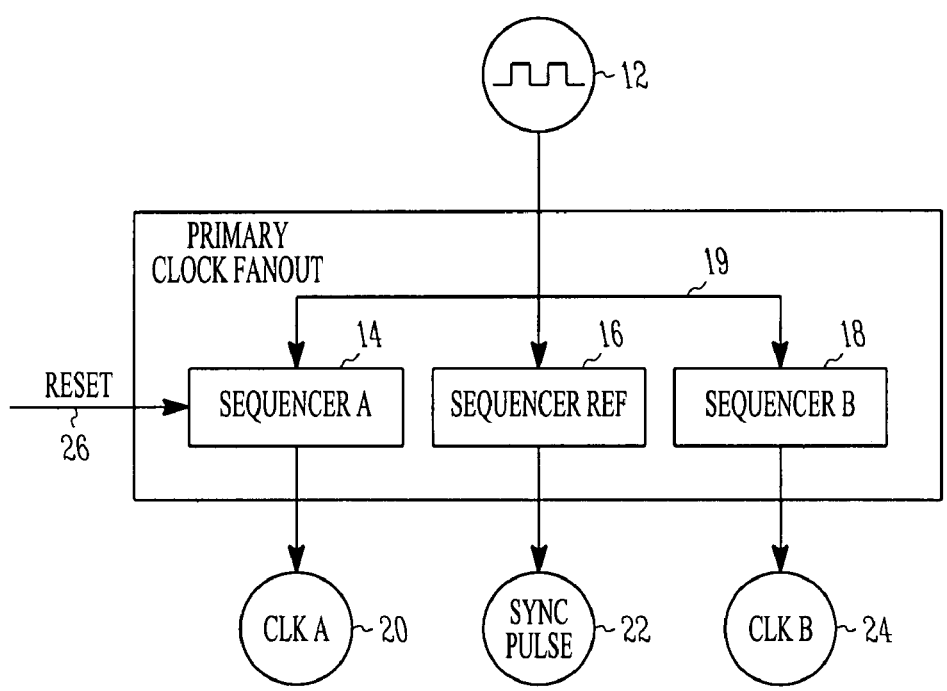
FIG. 1 is block diagram showing a primary source clock and how secondary clocks of different frequencies are derived from the primary clock source.

Referring initially to FIG. 1, a primary clock source 12 is connected to a group of sequencers 14, 16 and 18 for generating secondary clocks 20, 22 and 24 for driving different elements, circuits or domains (not shown in FIG. 1) in a system or device of which the primary clock source 12 and sequencers 14, 16 and 18 and clocks 20, 22 and 24 form a part. The primary clock 12 is a stable, high frequency and symmetrical source. The primary clock 12 is connected to the sequencers 14, 16 and 18 through a balanced fanout 19 to reduce scaler clock skew between the sequencers. A reset 26 is used to synchronously reset the sequencers 14, 16 and 18 to set all the sequencers in "lock step" during initialization of the circuit to guarantee that the secondary clocks 20, 22 and 24 will be in synchronization. The sequencers 14, 16 and 18 are respectively coupled to "clk A" 20, "Sync Pulse" 22 and "clk B" 24 by a balanced fanout tree with matching delays to insure the synchronization between the clocks 20, 22 and 24 and therefore synchronous low skew data transfer between domains clocked respectively by "clk A" 20 and "clk B" 24. Sync Pulse 22 is a sync message or pulse which will be used by "clk A" 20 and "clk B" 24.

Figure 2A:
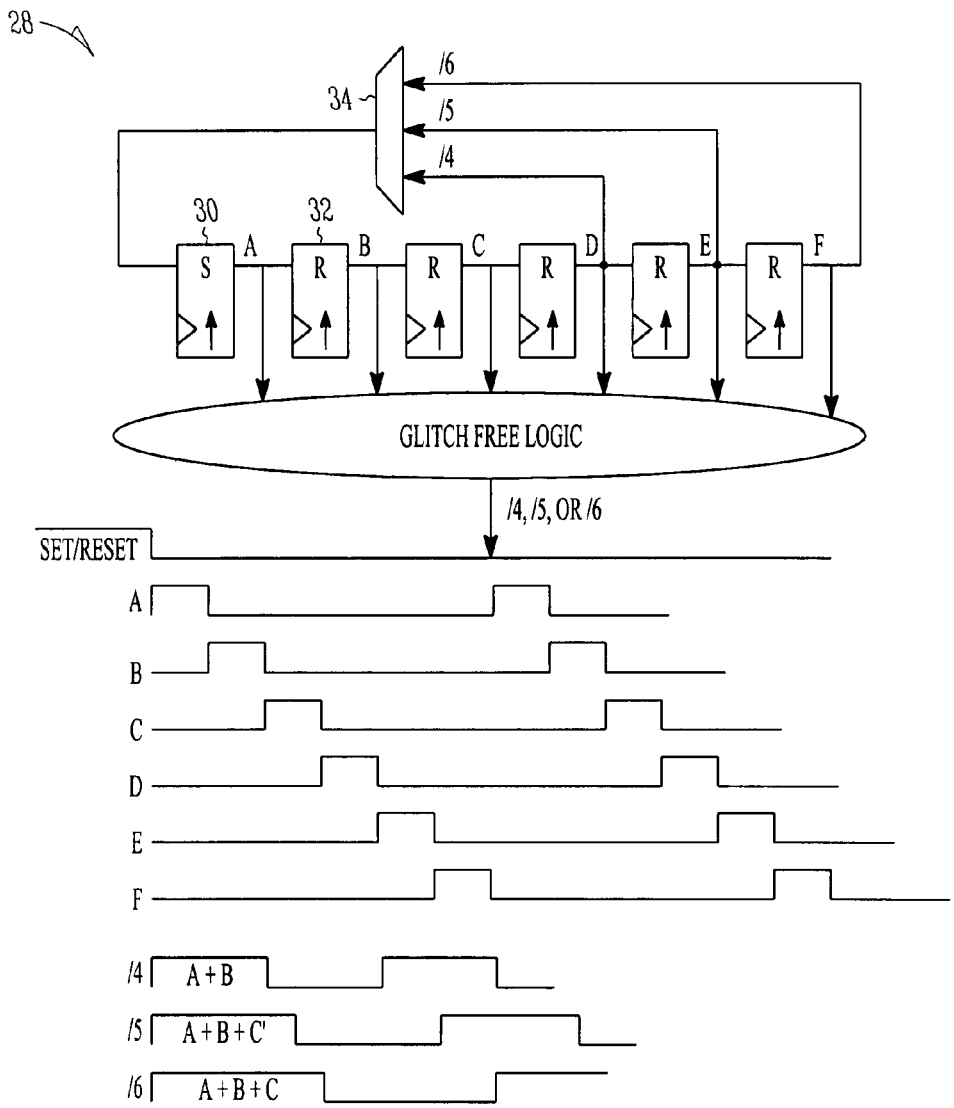
FIG. 2A is a schematic diagram of a sequencer in FIG. 1 further illustrating how secondary clocks of different frequencies are derived from a primary clock source.

FIG. 2A is a detailed schematic diagram of an example of a sequencer 28 that may be used for the sequencers 14, 16 and 18 of FIG. 1 to derive the secondary synchronous clocks 20, 22 and 24 operating at different frequencies. The sequencer 28 includes a set master and slave latch, flip flop or the like 30 and series of reset master and slave latches, flip flops or the like 32. The output of each of the master and slave latches 30 and 32 generate a clock pulse waveform that is phase or time shifted as shown in the timing diagram associated with FIG. 2A. The clock pulses may be selected by a multiplexer or selector 34 to provide the desired clock pulse width and frequency. Examples of divide by 4 (/4), divide by 5 (/5) and divide by 6 (6/) clock frequency waveforms are shown in FIG. 2A.

Figure 2B:
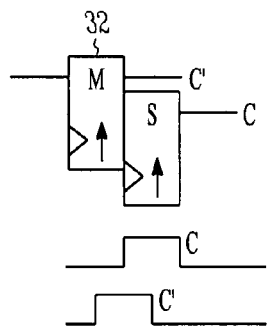
FIG. 2B is a schematic diagram illustrating how a half cycle phase shift is generated in the timing diagrams associated with FIG. 2 A.

FIG. 2B illustrates how a half cycle shift is generated from the master and slave flip flop 32. A clock distribution that provides a 50% duty cycle is used. The master and slave latches receive inverted clocks that provide for triggering on the pulse edges. The match latch C' output is used to obtain the half cycle phase shift C'.

Figure 3:
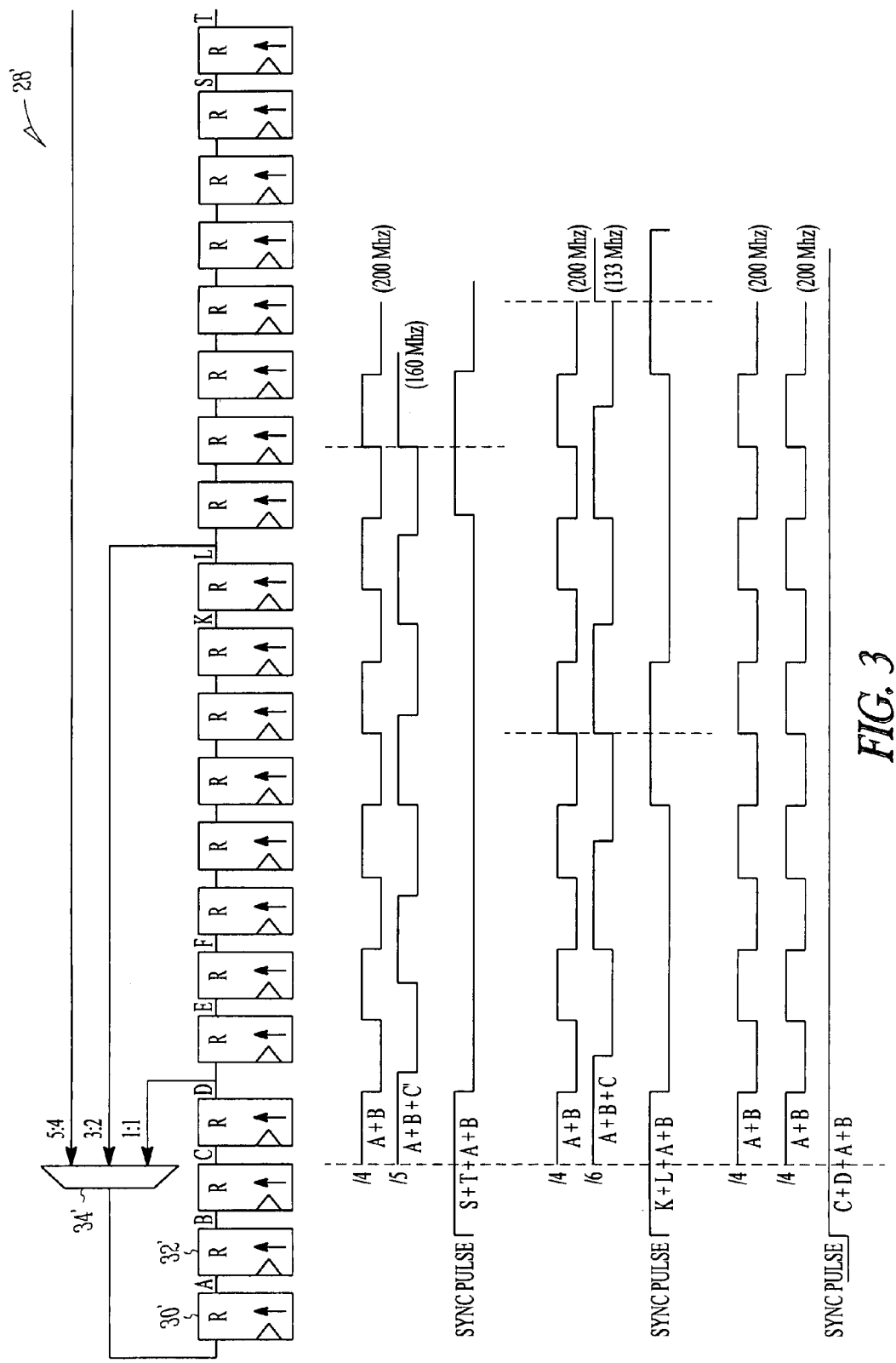
FIG. 3 is a schematic diagram of a secondary sync pulse sequencer for deriving secondary sync clocks for generating clock pulses of different frequencies and pulse widths.

FIG. 3 is a further example of a secondary sync pulse sequencer 28' illustrating how secondary clock pulse waveforms of different frequencies for driving different circuits or domains within a system or device can be derived. FIG. 3 further illustrates how the Sync Pulse is generated for different ratios of high to low clock pulse frequencies. For example, the Sync Pulse for a clock pulse ratio of 5:4 (200 Mhz to 166 Mhz) is generated by selecting the S+T+A+B outputs; the clock pulse ratio for 3:2 is generated by selecting K+L+A+B; and the clock pulse ratio for 1:1 is generated by selecting C+D+A+B.

Figure 4:
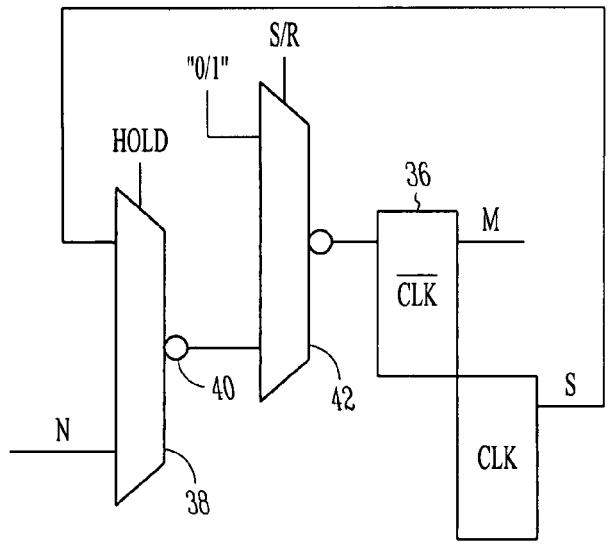
FIG. 4 is a schematic diagram of a basic sequencer element.

FIG. 4 shows an example of a basic sequencer element 30 or 32 for use in the sequencers 28 and 28' of FIGS. 2A and 3. The basic sequencer element 30, 32 includes a master/slave flip flop 36. The slave output S is feed back to the input of a multiplexer or selector 38 and multiplexed with an input labeled "D." The output 40 of the multiplexer 38 is feed to the input of a second multiplexer 42 where the output 40 of multiplexer 38 may be multiplexed with a 0 or 1 input. A "HOLD" function is provided with multiplexer 38 and a "SET/RESET (S/R)" function is provided with multiplexer 42. Each flip flop 30, 32 of all sequencers preferably have this functionality to permit synchronous reset and stop clock features.

Figure 5:
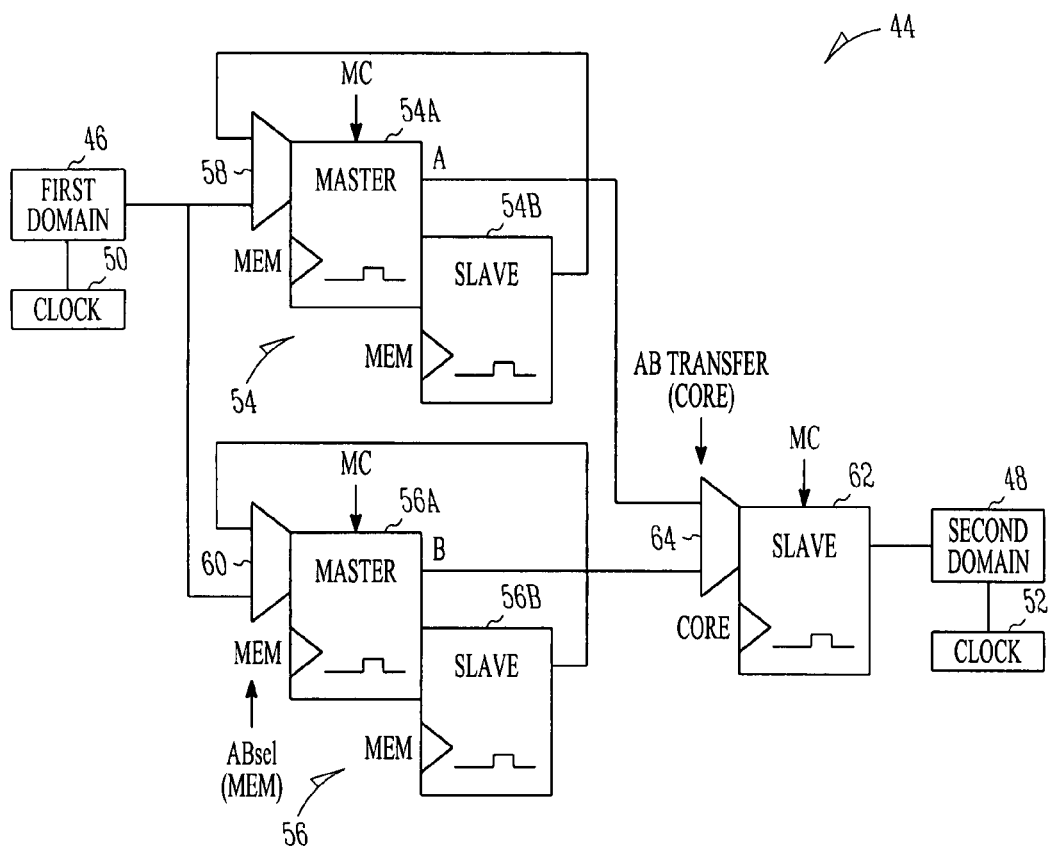
FIG. 5 is a schematic diagram of an interface circuit for transferring data from a first domain clocked at one frequency to a second domain clocked at a different frequency in accordance with the present invention.

In accordance with the present invention, shown in FIG. 5 is an interface 44 for permitting synchronous data transfer between a first domain 46 clocked at one frequency by a secondary clock 50 and a second domain 48 clocked at another frequency by a secondary clock 52. Each of the domain clocks 50 and 52 are derived from the same high frequency source as previously described with respect to FIGS. 1–3. The interface 44 includes a first master and slave flip flop or the like 54 and a second master and slave flip flop or the like 56, each connected to the first domain 46. The master latches 54a and 56a of flip flops 54 and 56 are each respectively directly coupled to an input of the associated slave latch 54b and 56b of the flip flops 54 and 56. The Slave latch output for each flip flop 54, 56 is respectively feed back to a multiplexer or selector 58, 60 at the input of each master latch 54a and 56a, respectively. The Slave latch output is then multiplexed with any data from the first domain 46 loaded into either master latch 54a or master latch 56a. The master latch output of master latch 54a labeled "A" and the master latch output of master latch 54b labeled "B" are multiplexed into a slave latch 62 by a multiplexer or selector 64 at the input to the slave latch 62. The multiplexer 64 and slave latch 62 gate or transfer data loaded from the first domain 46 into either the master latch 54a or the master latch 56a into the second domain 48 as will be described in more detail herein.

Figure 6:
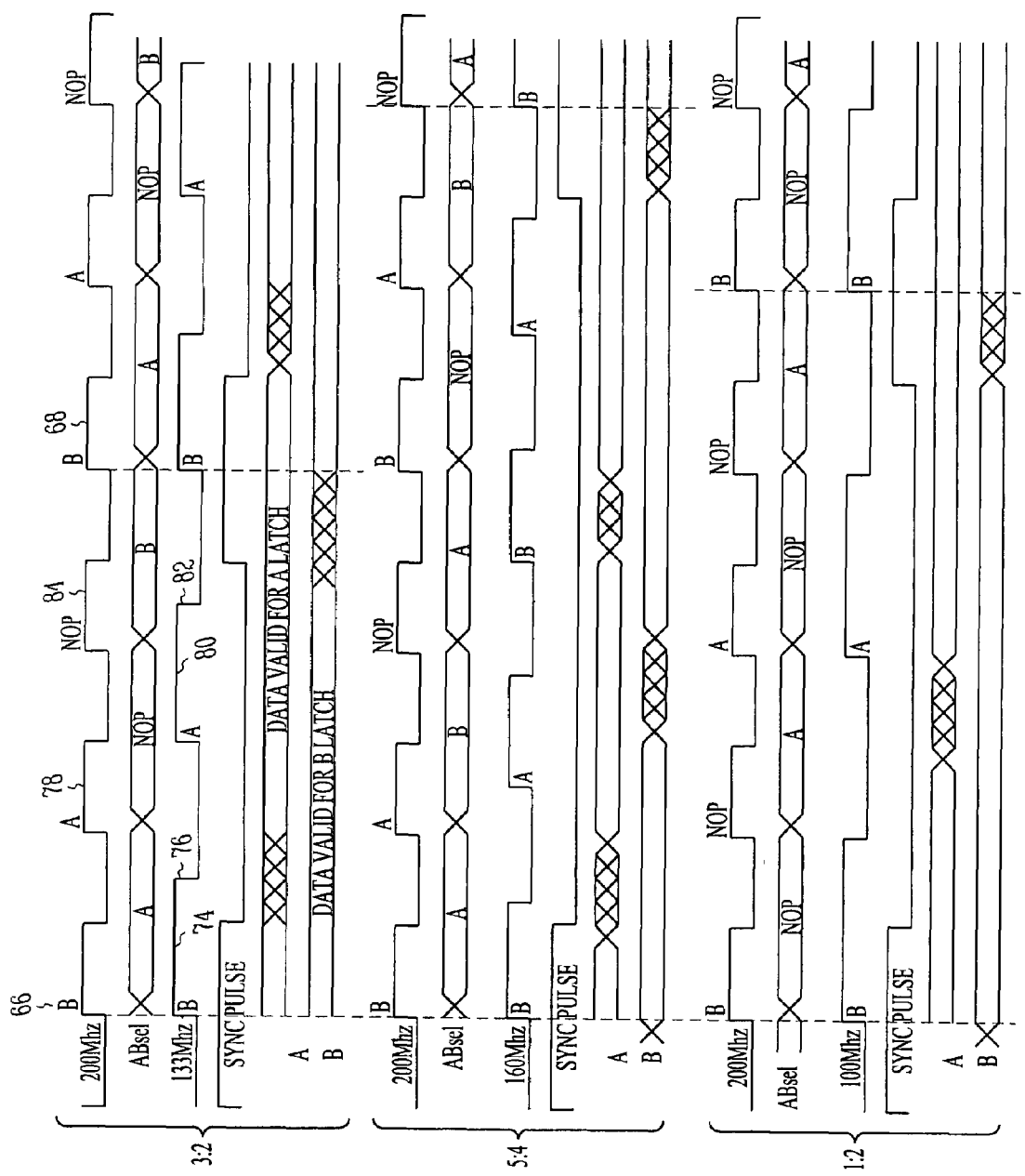
FIG. 6 is a timing diagram of the operation of the interface circuit of FIG. 5 illustrating data transfer from a domain clocked at one frequency to a domain clocked at a slower frequency for different sync clock frequency ratios of the first and second domain clocks.

The operation of the interface 44 for transferring data from the first domain 46 clocked at one frequency to the second domain 48 clocked at a slower frequency or clock speed is described by referring to the three sets of timing diagrams in FIG. 6. Each set of waveforms represents a different ratio of clock frequencies between the first and second domains. Referring initially to the 3:2 ratio waveforms or timing diagrams, the first domain 46 is clocked at 200 Mhz and the second domain 48 is clocked at 133 Mhz. The synch pulse is derived so that it begins and ends coincident with the negative edges of the faster domain clock in this case the 200 Mhz clock. As shown in FIG. 6 the secondary clocks 50 and 52 for the first domain 46 (200 Mhz) and the second domain 48 (133 Mhz) are repeated in a systematic pattern with each cycle being framed by the sync pulse (vertical broken lines 66 and 68). An ABsel signal is generated to alternately select either the master latch 54a of flip flop 54 or the master latch 56a of flip flop 56 for loading data from the first domain 46. For simplicity of explanation in reference to FIGS. 5 and 6, the output "A" of the master latch 54a corresponds to clock pulses also labeled "A" in FIG. 6. When an "A" clock pulse occurs in the 200 Mhz waveform clocking the first domain 46, data will be loaded into the master latch 54a and when an "A" clock pulse occurs in the slower frequency waveform (160 Mhz, 133 Mhz or 100 Mhz) the data loaded in the master latch 54a will be transferred or gated to the second domain 48 through the slave latch 62. Similarly, the output "B" of the master latch 56a for flip flop 56 corresponds to clock pulses also labeled "B" in FIG. 6. When a "B" pulse occurs in the 200 Mhz waveform clocking the first domain 46, data will be loaded into the master latch 56a and when a "B" pulse occurs in the slower frequency waveform clocking the second domain, the data loaded in the master latch 56a will be transferred or gated to the second domain 48 from slave latch 62. The ABsel select signal is generated to select the other of master latches 54a or 56a in response to or by a positive edge of an "A" or "B" pulse for loading data into one of the master latches 54a or 56a. For example, when a "B" pulse occurs clocking the first domain 46, data is loaded into the master latch 56a and the interface 44 is switched to the master latch 54a for receiving data when the next "A" pulse occurs. Similarly, the interface 44 will switch to the master latch 56a after an "A" pulse so that data can be loaded into the master latch 56a when the next "B" clock pulse occurs.

In the repeating pattern of FIG. 6, the master latch 56a is initially selected or enabled by ABsel to receive data from the first domain 46. Data is then received or loaded into the master latch 56a from the first domain 46 when the first domain is clocked by the 200 Mhz clock 50 as shown by the first "B" pulse 70 of the 200 Mhz clock waveform in FIG. 6. After loading data into the master latch 56a the signal ABsel is generated to switch from master latch 56a to master latch 54a when the first domain 46 is next clocked for transferring data.

Slave latch 62 alternately looks at the outputs A and B of latches 54a and 56a, respectively. Because of the sync pulse 72, the second domain 48 will be synchronously clocked by a first "B" pulse 74 of the 133 Mhz clock 52 and the slave latch 62 will immediately transfer the data to the second domain 48. The negative edge 76 of the 133 Mhz "B" pulse will cause a signal ABtransfer (FIG. 5) to be generated to toggle the slave latch 62 to look or switch to the "A" output of the master latch 54a.

The next clock pulse 78 of the 200 Mhz clock 50, designated "A" in FIG. 6, will cause data from the first domain 46 to be loaded into the master latch 54a. The data in master latch 54a will then be transferred to the second domain 48 when the second domain 48 is clocked by the next clock pulse 80 of the 133 Mhz clock 52, correspondingly designated as "A" on the 133 Mhz waveform in FIG. 6 to indicate correspondence with the "A" output of the master latch 54a. The negative edge 82 of the 133 Mhz "A" pulse will cause the signal ABtransfer to be generated to toggle the slave latch 62 to look or switch to the "B" output of the master latch 56a.

To prevent a race condition or the faster domain overrunning the slower domain and to force average data transfer rates and minimal latency, the next clock pulse of the 200 Mhz clock is designated as a "non-operate" (NOP) pulse 84 during which no data is loaded or transferred.

The waveforms labeled "A" and "B" in FIG. 6 illustrate the time frames when data is valid for master latch 54a (A output) and master latch 56a (B output) and when the data is unreliable or uncertain as indicated by the "XXX" or cross-hatching. These periods occur after a toggle between master latches 54a and 56a when data is to be loaded into the other master latch.

As evident from FIG. 6, the cyclical pattern will continue with data being loaded alternately into master latch 54a or master latch 56a from the first domain 46 and transferred to the second domain 48 when the second domain 48 is clocked by a next or subsequent clock pulse. By examination, it can be seen that the 5:4 and 2:1 ratio frequency differences between the second and first domains 46 and 48 operate in the same manner. By comparing the 3:2 waveforms to the 5:4 and 2:1 waveforms, it is apparent that the present invention works for various ratios of clock frequency differences for transferring data between domains clocked at different frequencies.

Figure 7:
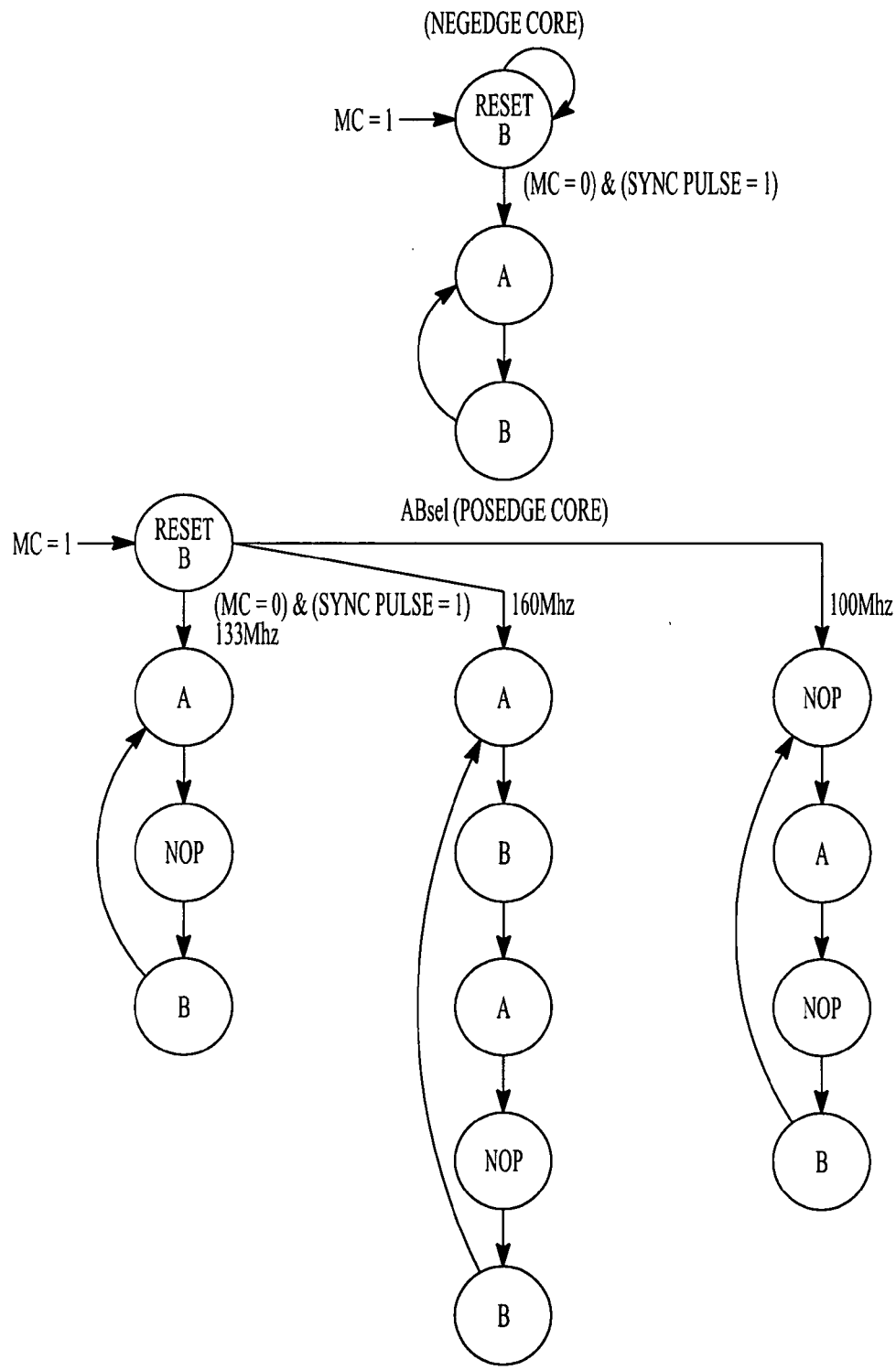
FIG. 7 is a state diagram of the sequence of operation illustrated in FIG. 6.

FIG. 7 is a state sequence diagram illustrating the different operational states for transferring data between the first and second domains 46 and 48 and further illustrates the repeating pattern for loading data into master latches 54a and 56a and transferring the data to the second domain 48. The sequence can be initialized or restarted by a master clear, mc=1, to reset the latches 54, 56 and 62. The sequence will then begin again when mc=0 and a sync pulse is received.

Figure 8:
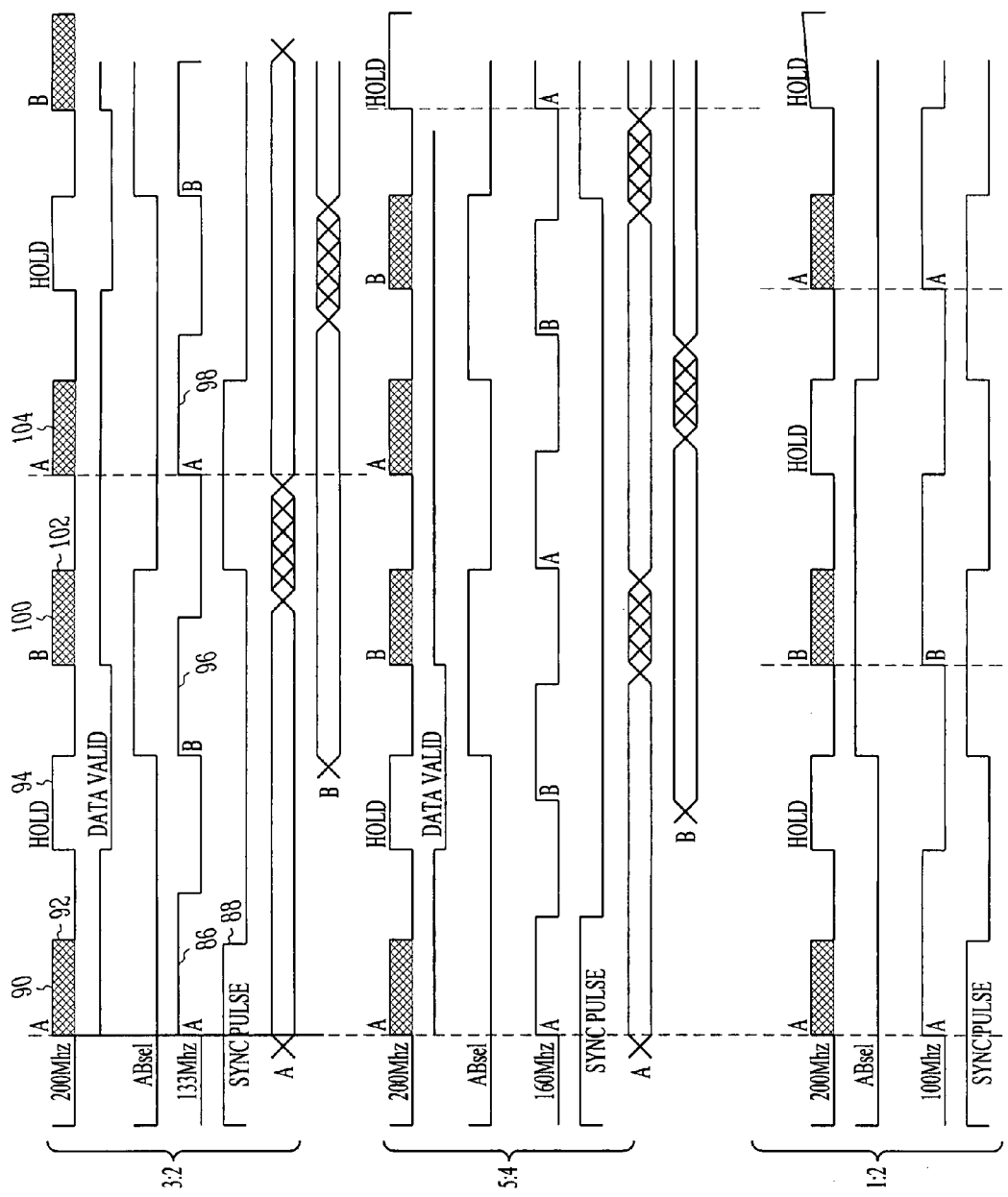
FIG. 8 is a timing diagram of the operation of the interface circuit of FIG. 5 illustrating the timing for data transfer from a first domain clocked at one frequency to a second domain clocked at a faster frequency for different sync clock frequency ratios of the first and second domain clocks.

Referring now to FIG. 8, a timing diagram for FIG. 5 is shown illustrating the transfer of data from the domain 46 to the second domain 48 in which the first domain is clocked by a slower clock (160 Mhz, 133 Mhz or 100 Mhz) compared to the second domain which is clocked by a faster clock, in this case 200 Mhz. The interface 44 will operate analogously to the previously described examples where data is being transferred from a faster clocked domain to a slower clocked domain (FIG. 6). Referring to the 3:2 set of waveforms, the first "A" pulse 86 of the 133 Mhz waveform will permit data to be loaded into the master latch 54a from the first domain 46 in FIG. 5. Because of the sync pulse 88, the second domain 48 is synchronously clocked by the "A" pulse 90 of the second domain clock 52, operating at 200 Mhz in this example and the data is immediately transferred into the second domain 48 via slave latch 62. As before, the negative edge of the second domain clock pulse will cause the slave latch 62 to toggle to look at the other of the "A" or "B" output of the master latches 54a and 56a. Accordingly, the negative edge 92 of the "A" clock pulse 90 of the 200 Mhz clock will cause the slave latch 62 to switch to the "B" output of master latch 56a. To coordinate data transfer from the first and second domains 46 and 48 in this example of going from a slower clocked domain to a faster clocked domain, the next clock pulse 94 of the faster second domain clock 52 will be designated as a "HOLD" or non-operate (NOP) pulse to permit the slower clocked domain to catch up or keep up. The next "B" pulse 96 of the 133 Mhz first domain clock 50 will permit data from the first domain 46 to be loaded into the master latch 56a. The ABsel signal will be generated to toggle to master latch 54a to receive data when the first domain 46 is clocked by the next "A" pulse 98. When the second domain 48 is clocked by the next "B" pulse 100 of the second domain 200 Mhz clock 52, the data loaded into master latch 56a will be transferred via slave latch 62 to the second domain 48. As before, the negative edge 102 of the second domain "B" clock pulse 100 will generate the signal ABtransfer to cause the slave latch 62 to switch to the "A" output of master latch 54a to receive data when the next "A" pulse 104 of the second domain clock 52 occurs.

Those of skilled in the art will recognize that the 5:4 and 2:1 ratio frequencies will operate analogously to that just described with respect to the 3:2 frequency ratio.

Figure 9:
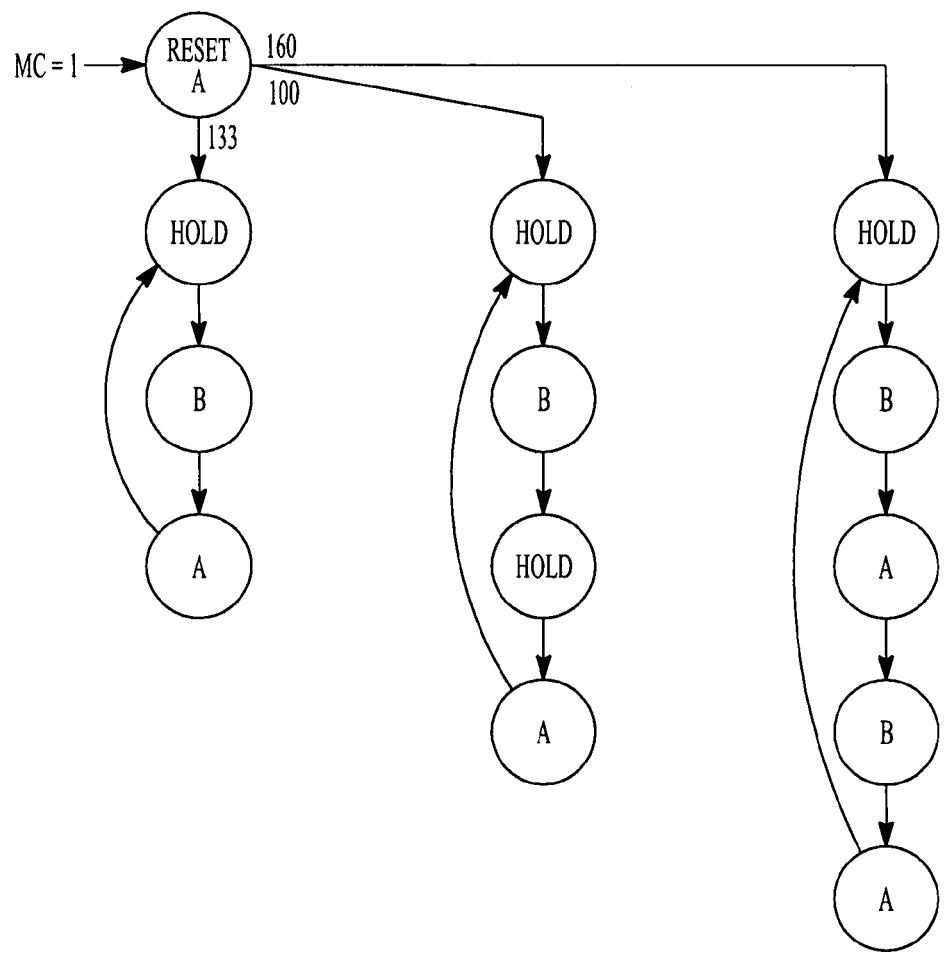
FIG. 9 is a state diagram of the sequence of operation illustrated in FIG. 8.

FIG. 9 is a state diagram illustrating the different states of operation for transferring data from a first domain 46 clocked at one frequency to a second domain 48 clocked at as faster frequency as illustrated by the timing diagrams in FIG. 8.

One example of an application of the present invention is were the first domain 46 may be a memory controller IC clocked at one rate or frequency that synchronously communicates with a memory, the second domain 48, that may be clocked at several possible rates. The present invention thus provides synchronous data transfer for several frequency ratios with a single design. This means that a migratory memory upgrade path is achieved without the need for costly IC redesigns and with the benefits of synchronous performance.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. An interface for synchronous data transfer from a first domain clocked at by a first clock at a first frequency to a second domain clocked by a second clock at a slower frequency, comprising:
   a first latch for receiving data from the first domain when the first latch is selected;
   a second latch for receiving data from the first domain when the second latch is selected; and
   a third latch for transferring data from said first latch or said second latch to the second domain when the second domain is clocked by a clock pulse of the second clock, said third latch being selectively toggled to receive data from said first latch or said second latch in response to a negative edge of the clock pulse clocking the second domain;

wherein the first and second latches are clocked by the first clock at the first clock frequency; and wherein the first clock clocking the first domain and the second clock clocking the second domain are both derived from a single primary clock and generate clock pulses that repeat in a ratioed, systematic pattern framed by a secondary synch pulse also generated as a function of the same primary clock.

2. The interface of claim 1, wherein at least one clock pulse of the first domain clock is a non-operate (NOP) clock pulse in each repeated systematic pattern when no data from the first domain is loaded into either said first latch or said second latch to cause equal average data transfer between the first domain and the second domain.

3. The interface of claim 2, wherein the NOP clock pulse is selected to minimize latency and prevent the slower clocked domain from being overrun by the faster clocked domain.

4. The interface of claim 1, wherein said first and second latches are selected by a select signal, said select signal being generated to select one of said first or second latches when the other of said first or second latches receives data.

5. An interface for synchronous data transfer between a first domain clocked at one frequency and a second domain clocked at a faster frequency, comprising:
 a first latch for receiving data from the first domain when the first latch is selected;
 a second latch for receiving data from the first domain when the second latch is selected; and
 a third latch selectively toggled to receive data from said first latch or said second latch in response to a negative edge of a clock pulse, other than a hold pulse, clocking the second domain and said third latch transferring data from said first latch or said second latch to the second domain when the second domain is clocked by a next clock pulse that is not a hold clock pulse;
 wherein a first clock clocking the first domain and a second clock clocking the second domain are both derived from a single primary clock and generate clock pulses that repeat in a ratioed, systematic pattern framed by a secondary synch pulse also generated as a function of the same primary clock.

6. The interface of claim 5, wherein the hold clock pulse is selected to minimize latency.

7. The interface of claim 5, wherein said first and second latches are alternately selected by a select signal, said select signal being generated to select one of said first or second latches when the other of said first or second latches receives data.

8. An interface for synchronous data transfer between domains clocked at different frequencies, comprising:
 a first latch for receiving data from a first domain clocked at one frequency when said first latch is selected;
 a second latch for receiving data from the first domain when said second latch is selected; and
 a third latch for transferring data from either said first latch or said second latch to a second domain clocked at another frequency;
 wherein the first domain is clocked at a slower frequency than the second domain and wherein said third latch is loaded when the second domain is clocked by a clock pulse that is not a non-operate pulse.

9. The interface of claim 8, wherein said third latch is alternately toggled to transfer data from said first or said second latch in response to a negative edge of a clock pulse clocking the second domain unless the clock pulse is a non-operate clock pulse.

10. A method for synchronous data transfer between clocked domains, comprising:
 loading a first master latch with data from the first domain in response to a first domain clock pulse;
 transferring the data loaded in the first master latch to the second domain through a slave latch in response to a second domain clock pulse;
 toggling the slave latch to switch to receive data from a second master latch in response to a negative edge of the second domain clock pulse that is not a non-operate clock pulse;
 loading the second master latch with data from the first domain in response to another first domain clock pulse;
 transferring the data loaded in the second master latch to the second domain through the slave latch in response to another second domain clock pulse;
 toggling the slave latch to switch to receive data from the first master latch in response to the negative edge of the clock pulse of the second domain clock that is not a non-operate clock pulse;
 repeating a cycle of alternately loading the first and second master latches and transferring data to the second domain through the slave latch until a master clear signal is received by the slave and master latches; and
 entering a non-operate state during each repeated cycle for at least one clock pulse of the faster domain clock;
 wherein the clock pulses of the first domain and the second domain are both derived from a primary clock and repeat in a ratioed, systematic pattern framed by a secondary synch pulse.

11. The method of claim 10, further comprising: generating a signal in response to loading one of the first or second master latches to cause data to be loaded alternately into the first and second master latches.

12. The method of claim 10, wherein the non-operate state is selected to minimize latency in transferring the data between the domains.

* * * * *